United States Patent
Traversa

(10) Patent No.: US 6,433,282 B1
(45) Date of Patent: Aug. 13, 2002

(54) SECTIONAL, MODULAR ORIENTABLE ELEMENT FOR FAIRLEAD RACEWAYS

(75) Inventor: Ezio Traversa, Lurate Caccivio (IT)

(73) Assignee: Manufatti Plastici Traversa Ezio S.N.C., Lurate Caccivio (IT)

( * ) Notice: Subject to any disclaimer, the term of this patent is extended or adjusted under 35 U.S.C. 154(b) by 0 days.

(21) Appl. No.: 09/912,726

(22) Filed: Jul. 25, 2001

(51) Int. Cl.⁷ .................................................. H02G 3/04
(52) U.S. Cl. ....................... 174/95; 174/68.1; 174/68.3; 174/69; 174/72 R; 174/72 A; 174/97; 174/99 R; 174/20 A; 174/113 C; 138/118; 285/18; 285/25; 285/27; 285/31
(58) Field of Search ................................ 174/68.1, 68.3, 174/69, 72 R, 72 A, 95, 97, 99 R, 20 A, 113 C; 138/118; 285/18, 25, 27, 31

(56) References Cited

U.S. PATENT DOCUMENTS

| | | | |
|---|---|---|---|
| 4,784,462 A | * 11/1988 | Priaroggia | 264/1.28 |
| 5,197,767 A | * 3/1993 | Kimura et al. | 138/120 |
| 5,900,586 A | * 5/1999 | Carr | 174/95 |
| 6,164,570 A | * 12/2000 | Smeltzer | 138/120 |

* cited by examiner

Primary Examiner—Dean A. Reichard
Assistant Examiner—Jinhee Lee
(74) Attorney, Agent, or Firm—Abelman, Frayne & Schwab

(57) ABSTRACT

A sectional, modular and orientable element for the formation of fairlead raceways (7) for wires (8), including a central body (2) provided with a plurality of shaped and aligned arms (6) which extend radially from said central bodies (2) and with means for their coupling. Said coupling means includes at least two sequential coaxial cavities (4, 5) obtained at an end (2) of said central body (2), and an extension provided at the free end of an hemispheric coaxial bull (3) obtained at the opposite end of said central body (2) and coaxial to said cavities (4, 5). The modular concatenation takes place by fitting the hemispheric bulb (3) of a first modular element with one of the cavities (4, 5) of a second modular element. The fitting in either the first (4) or the second sequential cavity (5) allows obtaining of concatenations that can be oriented following direction variations of the raceways, or that can be straight for linear raceways.

10 Claims, 2 Drawing Sheets

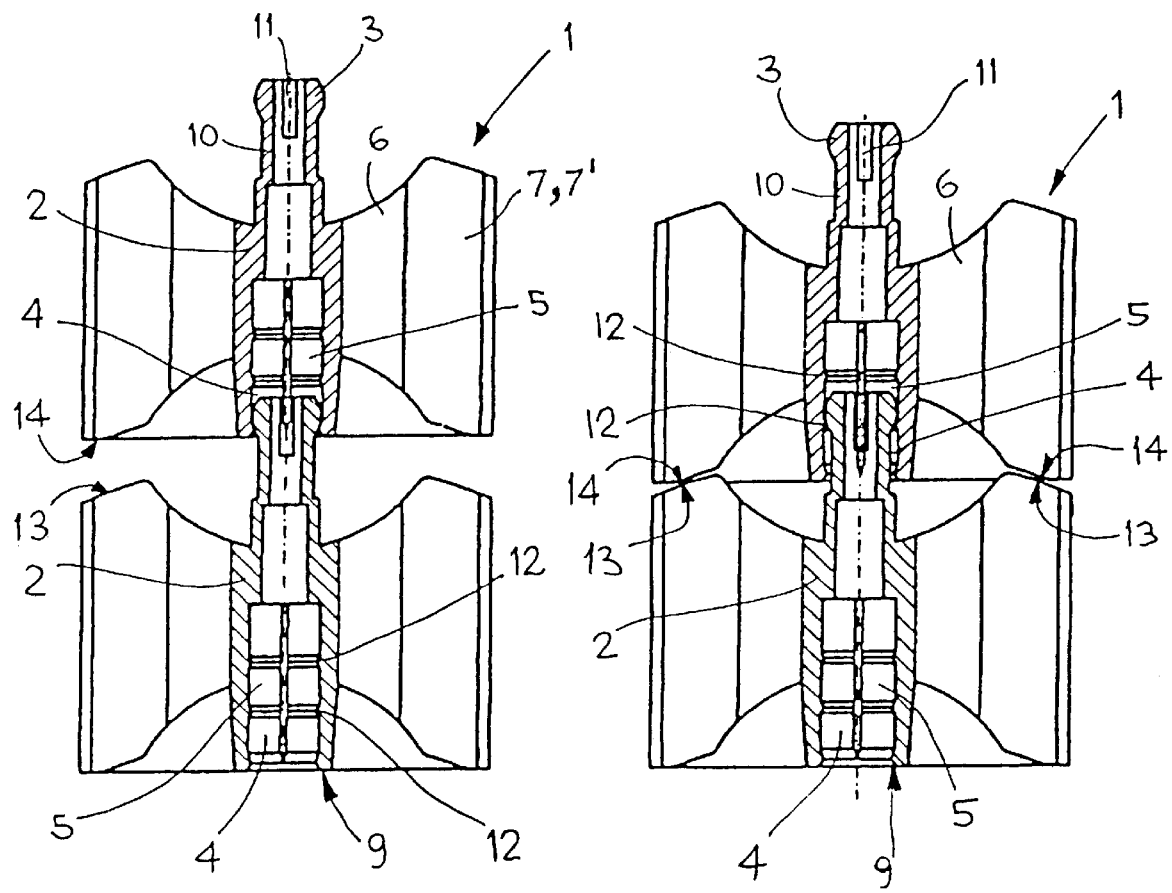
Fig. 1
Fig. 2
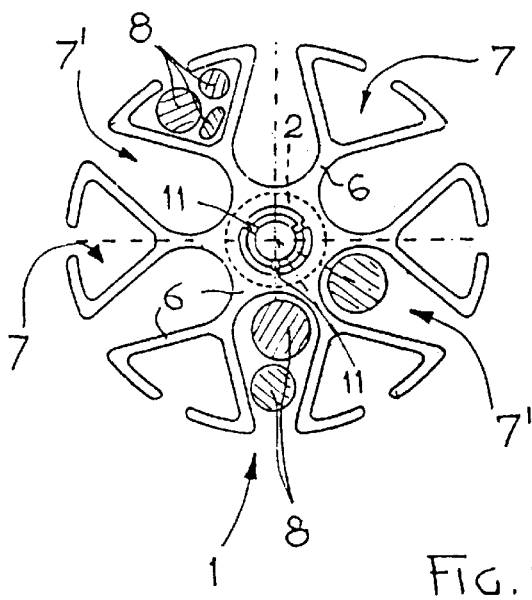
Fig. 3

SECTIONAL, MODULAR ORIENTABLE ELEMENT FOR FAIRLEAD RACEWAYS

BACKGROUND OF THE INVENTION (1) Field of the Invention

The present invention relates to a sectional, modular orientable element for fairlead raceways.

More particularly, the present invention relates to a sectional, modular and orientable element for the formation of single or multiple, rectilinear and/or curvilinear raceways for electric wires.

(2) Description of the Related Art

Sectional elements for the formation of single or multiple raceways for electric wires are already known. In particular, sectional raceways are known that are formed by fixed peripheral supports, which must be tied to the surfaces by means of glues, screws or the like. Through such raceways, the vertical feeders are located in correspondence of guide and support walls, and the variations in the wire ways, especially the orthogonal ones, are not guided in any way.

Raceways for single or multiple wires are also known that are obtainable with coupling means fitted into one another. Also these coupling means, though being more functional than the fixed peripheral supports, require particular assembly contrivances and the use of specific accessories, such as orientation brackets, protection bases and the like, to compose the parts concerning the way variations of the wire, especially for orthogonal way variations, Object of this invention is to eliminate the above drawbacks.

More particularly, object of this invention is to provide a sectional, modular and orientable element such as to allow to realize single or multiple fairlead raceways with any way variations, even orthogonal.

BRIEF SUMMARY OF THE INVENTION

According to the present invention, this, object is achieved by a sectional, modular and oriental element having the features of the characterizing part of claim 1.

The central bodies are sectional in a concatenated sense by means of the mutual fitting association of the peripheral hemispherical bulbs of the ones with the complementary cavities of the other ones.

The individual modular elements are so aligned that the plurality of shaped arms form continuous channels wherein the wires are located.

The bulbs are located at the end of linear extensions that allow the fit either in the outermost or the innermost cavity, so that the corresponding sequential concatenation of the modular elements allows to realize flexible and oriental couplings, to form parts of curved raceways intended for variations in the direction of the wires contained therein, or rigid linear couplings, to form parts of curved raceways intended for linearly oriented cables.

Therefore, the modular element of the present invention allows to realize rigid or flexible couplings, operating on the positioning of the hemispheric bulbs in the innermost or outermost cavities.

The advantages achieved with the modular element of the present invention lie in that, depending on the more or less deep fitting of the hemispheric bulbs, the same type of elements is utilized for the formation of continuous ways, comprising linear or curved portions, without needing external accessories; for the formation of curvilinear raceways, the coupled modular elements are partly inclined.

Wires of the same or a different configuration may be located in the sectional raceways.

The modular elements ensure a rational and continuous formation of said raceways, independently on their development, their length and their orientation.

BRIEF DESCRIPTION OF THE SEVERAL VIEWS OF THE DRAWING(S)

The constructive and functional characteristics of the modular, sectional and orientable elements of the present invention will be better understood thanks to the following description wherein reference is made to the figures of the attached drawings which represent some embodiments reported only by non limiting example, and wherein:

FIG. 1 shows the schematic view of a lateral section of a couple of sectional, modular element fittingly concatenated in correspondence of the outermost complementary cavity, for the formation of curved portions of raceways;

FIG. 2 shows the schematic view of a lateral section of a couple of sectional, modular element fittingly concatenated in correspondence of the innermost complementary cavity, for the formation of linear portions of raceways;

FIG. 3 show the schematic plan view of an example of configuration of compatible elements.

DETAILED DESCRIPTION OF THE INVENTION

Figure 4:
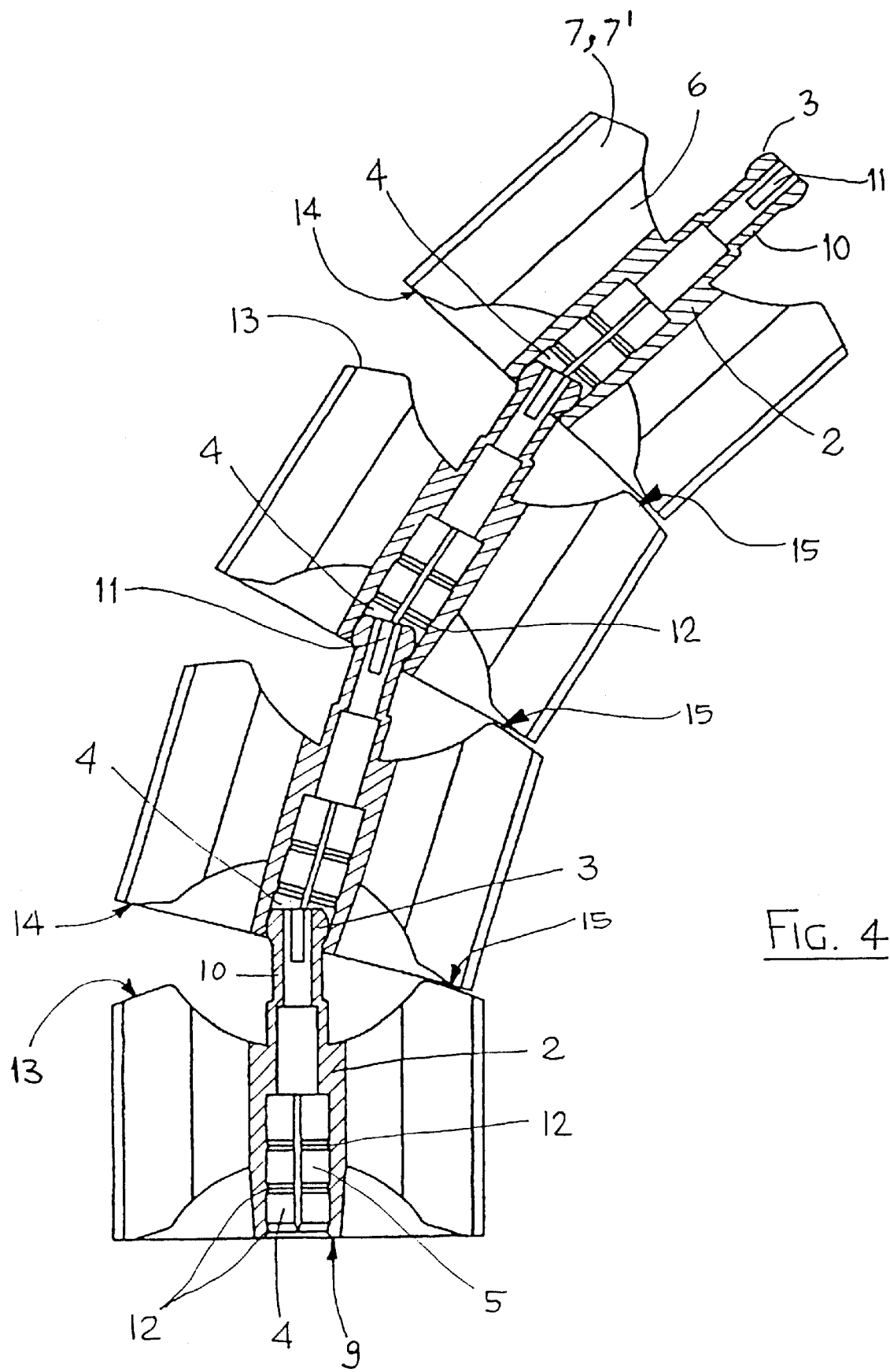
FIG. 4 shows the schematic view of a lateral section of a plurality of concatenated sectional, modular elements, arranged according to a curvilinear orientation.

With reference to the figures, the sectional, modular element of the present invention, indicated by 1 as a whole, comprises a central body 2 having an end provided with a hemispheric bulb 3, and the opposite end provided with complementary sequential and coaxial cavities, 4, 5. The sequential and coaxial cavities 4, 5 are circumscribed by annular fitting edges 12 having a diameter slightly smaller that that of said cavities. Bulb 3 and the complementary cavities 4, 5 are coaxial with each other and with the central body 2.

From the central body 2 shaped arms 6 extend radially, distributed along its total or partial peripheral surface, said arms form channels 7, 7' having different forms and developments, suitable to engage therein wires 8 having different dimensions. Arms 6 are preferably fixed and integral with the central body 2, but, for particular applications, they may be movable, in which case body 2 is realized with longitudinal grooves, radial and shaped, for instance having a dovetail shape, wherein there are fitted the complementary inner ends of movable shaped arms 6, which develop for a length substantially equal to that of the same central body 2. Arms 6 may have different configurations, depending on the type of channels 7, 7' to be formed.

The sequential coaxial cavities 4, 5 are obtained in the rear end 9 of the central body 2, while the hemispheric bulb 3 is located at the end of an extension 10 whose central body 2 is provided in correspondence of the opposite end. Said extension 10 is coaxial with respect to cavities 4, 5 and its length is proportional to the number of cavities and the depth of the innermost coaxial cavity 5.

The central bodies 2 associate with each other in a concatenated alignment by means of the mutual fitting association of the hemispheric bulb 3 of the ones with one of the complementary axial cavities 4, 5 of the other ones. In such association also arms 6 are aligned, for the formation of the continuous channels 7, 7', wherein wires 8 are located.

Bulbs 3 are provided with radial notches 11, having the function of elastically straining, tapering toward the center and returning to the initial state during the step of pressure-insertion in the complementary cavities 4, 5, passing beyond the fitting annular edge 12. Having passed beyond the fitting edge 12, the bulbs are substantially fittingly engaged in one of said cavities 4, 5.

When bulb 3 of a modular element engages in the corresponding outermost complementary cavity 4 of another modular element (cf FIGS. 1 and 3), the respective modular elements remain spaced from each other for a stretch that depend on the length of the front ends 10. In such configuration, each hemispheric bulb 3 can oscillate in the inside of the respective cavity 4 and follow any oblique orientation, with respect to the coaxial orientation, until it takes on a maximum inclination when the facing edges, the external front one 13 of a previous modular element, respectively the rear one 14 of the other subsequent modular element, get in touch at a point 15. To increase the maximum possible inclination, said edges 13, 14 may be beveled. Several elements 1, sequentially fitted with each other with bulbs 3 engaged in the complementary outermost cavities 4, form more or less radial curved wholes that can satisfy the requirements of direction variation of the fitting channels 7, 7' of wires 8.

In case of coupling of bulbs 3 in the corresponding innermost cavities 5 (FIG. 2), the modular elements 1 get in touch along the total extension of the circumferences related to the facing edges, the external front one 13 of a modular element, respectively the rear one 14 of the adjoining modular element. The total adhesion of such edges cause any oscillation of the fittingly coupled modular elements 1 to be impossible, so that they can place only in a coaxial and linear alignment, forming rectilinear, vertical, horizontal or oblique channels 7, 7' restraining wire 8.

From the part where the end central bodies 2 have complementary free cavities (4, 5), auxiliary connection bodies may be employed that are provided with two bulb ends, one of which is inserted in the free cavity. The auxiliary bodies may have different lengths in order to allow the length adjustment of the channels. The terminals of the channels, developed with the adoption of the modular elements 1 of the present invention or comprising bodies or comprising auxiliary connection bodies, comprise tie-brackets which engage in the supporting structures, for instance under writing desk tops, on floors, walls and the like, by means of nails, screws or the like. Said brackets comprise eyelets wherein the hemispheric bulbs 3 of the end central bodies 2 fit in, to maintain the position and to orient the channels in the desired manner.

While the present invention has been described above with reference to some embodiments solely reported by way of non limiting examples, various changes and modifications may be introduced. Therefore, the present invention intends to comprise all the changes and modifications that fall within the spirit and the protection scope of the following claims.

What is claimed is:

1. A sectional, modular and orientable element for the formation of fairlead raceways comprising a central body (2) and fittingly coupling means (2), characterized in that said central body (2) is provided with a plurality of shaped arms (6) which extend radially from said central body (2) and form channels (7, 7') for fitting at least a wire (8), and in that said coupling means comprise at least two sequential coaxial cavities (4, 5) obtained at an end (9) of said central body (2) and an extension (10) coaxial with respect to said cavities (4, 5), obtained at the opposite end of said central body (2) and provided at the free end with a hemispheric coaxial bulb (3); said hemispheric bulb (3) having dimensions such as to fittingly engage in one of the cavities (4, 5).

2. The modular element according to claim 1, characterized in that the maximum length of extension (10) is proportional to the number of the cavities and the depth of the innermost coaxial cavity (5).

3. The modular element according to claim 1, characterized in that the sequential coaxial cavities (4,5) are circumscribed by annular edges (12) having a smaller diameter with respect to that of the cavities (4,5).

4. The modular element according to claim 1, characterized in that the bulb (3) is provided with radial strain notches (11).

5. The modular element according to claim 1, characterized in that the fitting of the hemispheric bulb (3) of a first modular element in the outermost complementary cavity (4) of a second modular element leads to an arrangement of the modular elements that is orientable and variable in a range comprised between the coaxial alignment position and a maximum oblique position corresponding to that where facing edges (13, 14) of the first and second modular elements touch at a common point (15).

6. The modular element according to claim 1, characterized in that the fitting of the hemispheric bulb (3) of a first modular element in the innermost complementary cavity (5) of a second modular element leads to an arrangement of the modular elements in a fixed, straight and coaxial association relation, with a contact extended along the whole circumference of facing edges (13, 14) of two adjoining elements.

7. The modular element according to claim 1, characterized in that the central body (2) is provided with a plurality of fixed shaped radial arms (6), distributed along the entire peripheral surface with an extension substantially corresponding to the length of said body (2), said arms being shaped to provide raceways (7, 7') for electric wires (8).

8. The modular element according to claim 1, characterized in that it comprises a plurality of radial shaped arms fittingly connected to the external peripheral surface of the central body (2), said arms being shaped for the constitution of raceways (7, 7') for electric wires (8).

9. The modular element according to claim 1, characterized in that a plurality of bodies provided with respective bulb-ends are connectable by insertion of each such bulb-end in cavities (4, 5) of the central body (2).

10. The modular element according to claim 1, characterized in that tie-brackets that engage with supporting structures allow maintaining the position and orientation of the raceways, said brackets each comprising an eyelet for reception of the hemispheric bulb (3) of the respective central body (2).

* * * * *